Figure 1:
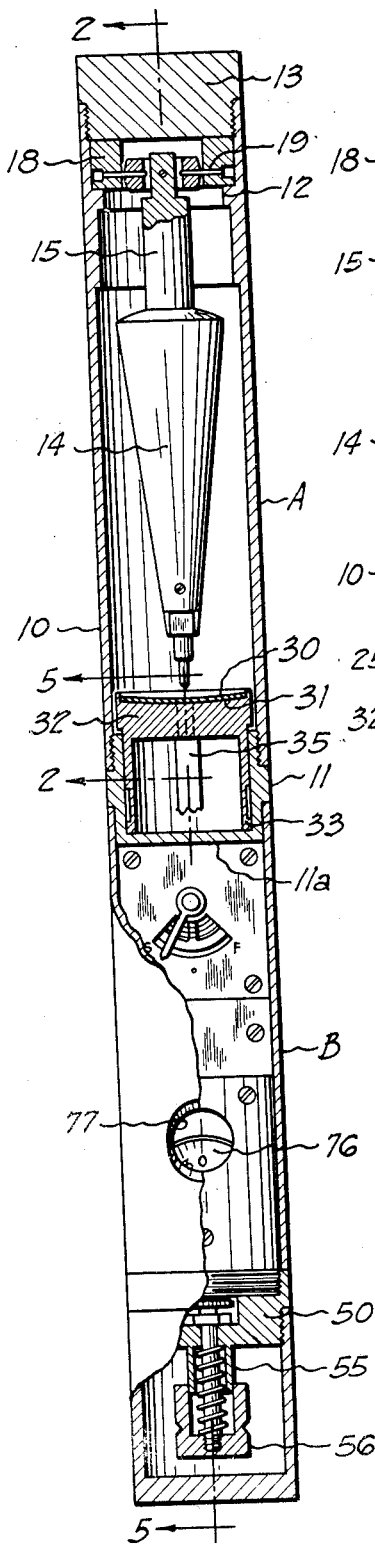

Dec. 22, 1942.  R. E. WILEY  2,305,944

INCLINATION INDICATING DEVICE

Filed Sept. 23, 1940　　3 Sheets-Sheet 1

Inventor
Ross E. Wiley
Jack A. Ashley
Attorney

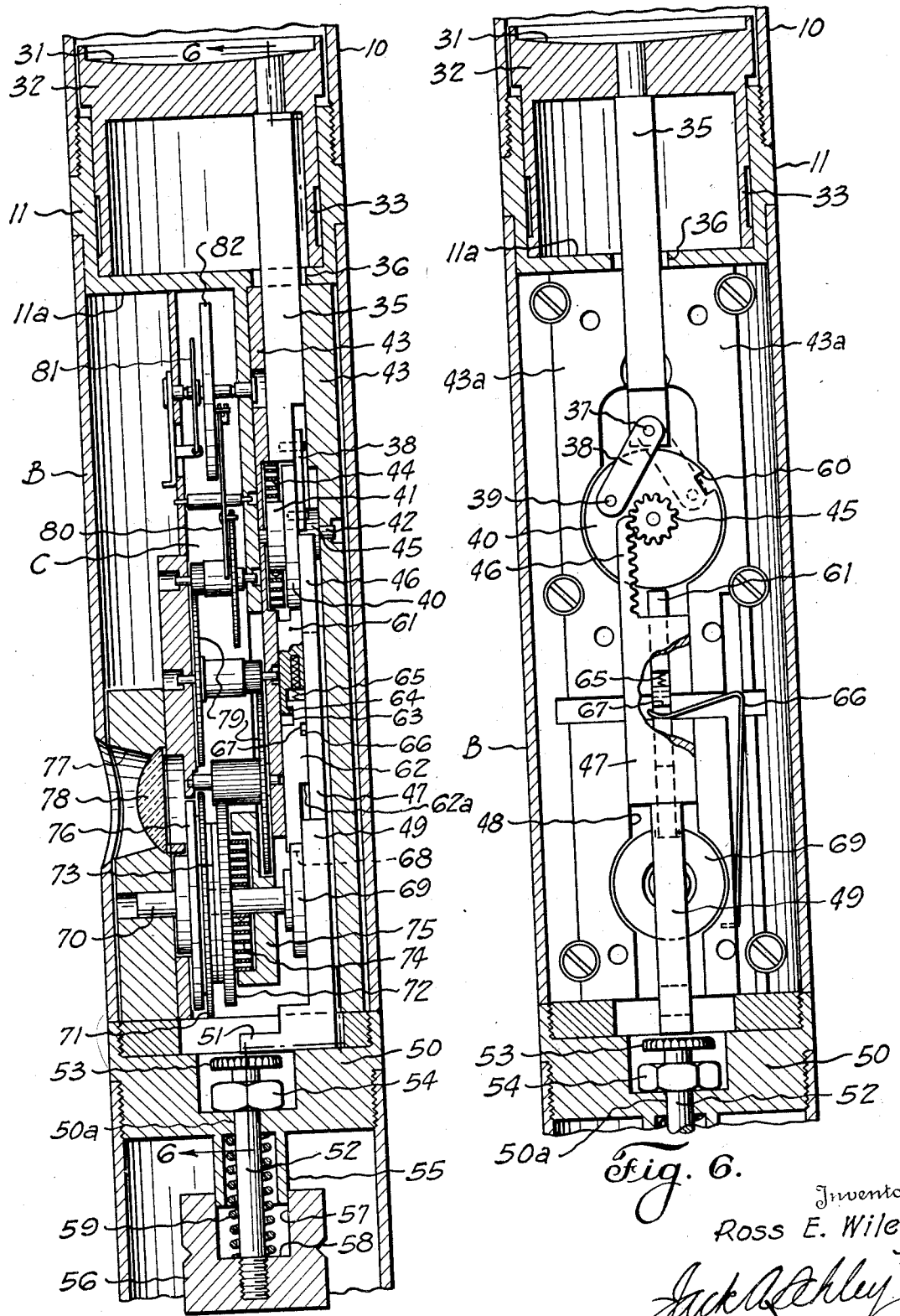

Dec. 22, 1942.    R. E. WILEY    2,305,944
INCLINATION INDICATING DEVICE
Filed Sept. 23, 1940    3 Sheets-Sheet 3
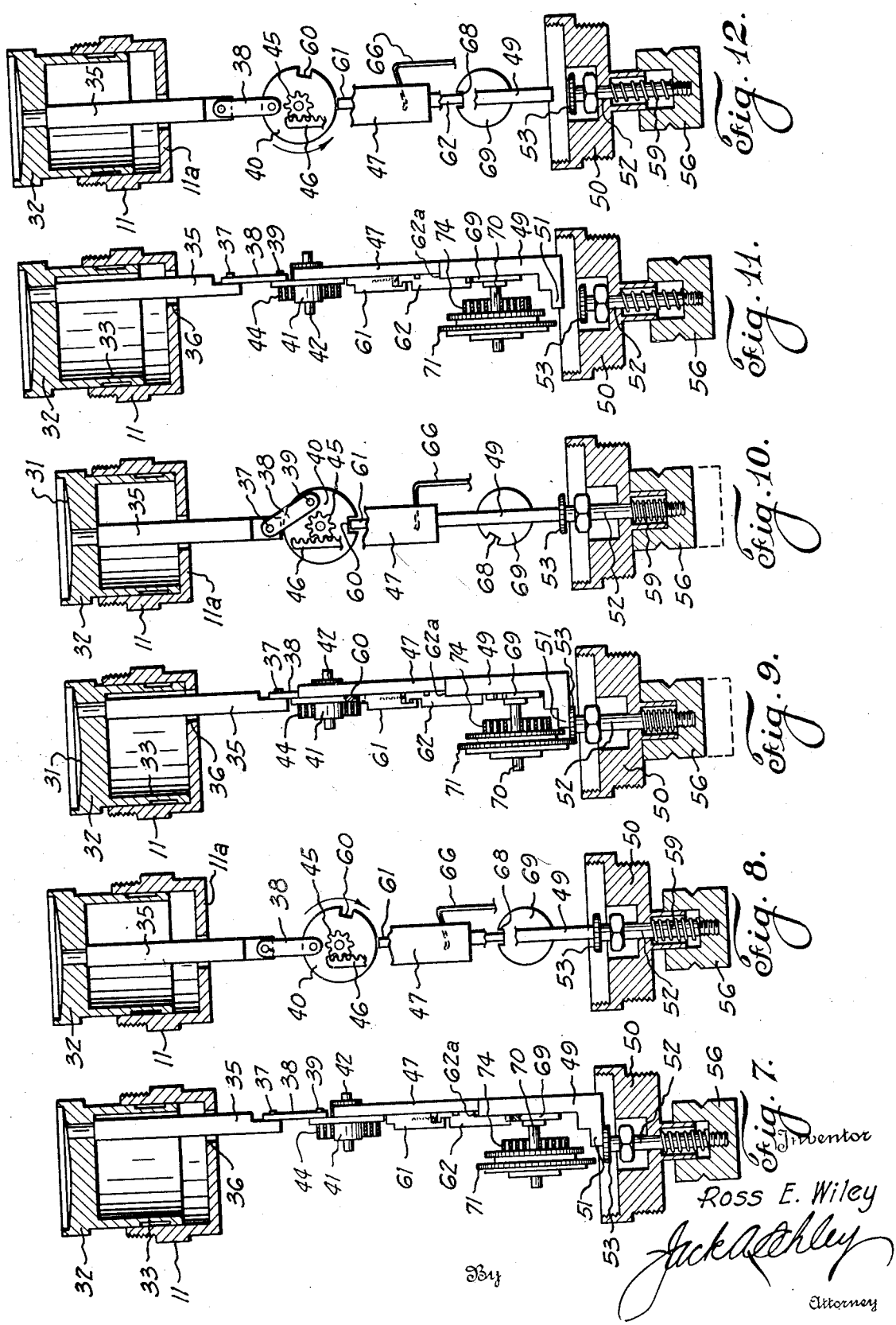
Inventor
Ross E. Wiley
By Jack Ashley
Attorney Patented Dec. 22, 1942

2,305,944

UNITED STATES PATENT OFFICE 2,305,944

INCLINATION INDICATING DEVICE

Ross E. Wiley, Long Beach, Calif., assignor to Eastman Oil Well Survey Company, Dallas, Tex., a corporation of Delaware, and Eastman Oil Well Survey Corporation, Long Beach, Calif., a corporation of California, jointly Application September 23, 1940, Serial No. 357,925

13 Claims. (Cl. 33—205.5)

This invention relates to new and useful improvements in inclination indicating devices.

One object of the invention is to provide an improved device which may be lowered into the well bore and which will accurately indicate and record the deviation or "drift" of said bore from the vertical, whereby the angular disposition of the bore, either during the drilling operations or after drilling is complete, may be determined.

An important object of the invention is to provide an improved inclination or drift indicator wherein the record is made by mechanical, rather than photographic, means, whereby the disadvantages incidental to the use of photographic film, are eliminated.

Another object of the invention is to provide an improved device having a plumb bob which carries a marking element arranged to engage an index member, the plumb bob and member normally spaced from each other and being movable toward each other to engage the member and marking element to form a record of the position of the plumb with respect to the vertical.

Another object of the invention is to provide an improved device, of the character described, wherein an improved time-controlled mechanism is employed for imparting a reciprocating movement to the disk on which the record is made, whereby said disk is moved into engagement with the marking element carried by the plumb bob at a predetermined time; said mechanism being relatively simple in construction and requiring no further adjustment after its original manufacture and assembly.

Still another object of the invention is to provide an improved inclination indicator having the operating mechanism for the record disk associated with a watch or clock mechanism which controls the time of actuation of said operating mechanism; the arrangement being such that a single setting element is employed for properly setting the clock mechanism and for simultaneously resetting the operating mechanism.

A further object of the invention is to provide an improved drift indicator, of the character described, wherein the marking element which is carried by the plumb bob is depressible and also rotatable, whereby when engaged by the index member, a positive mark or point on said member is assured.

A construction designed to carry out the invention will be hereinafter described, together with other features of the invention.

Figure 2:
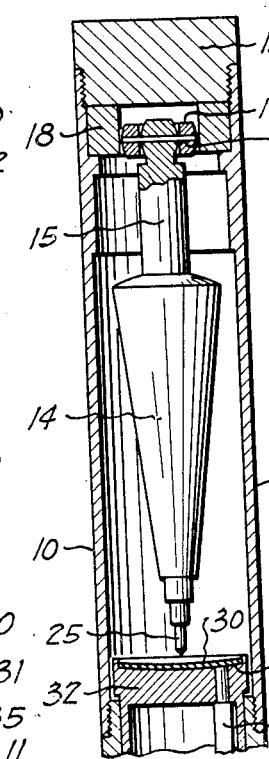
Figures 3, 4:
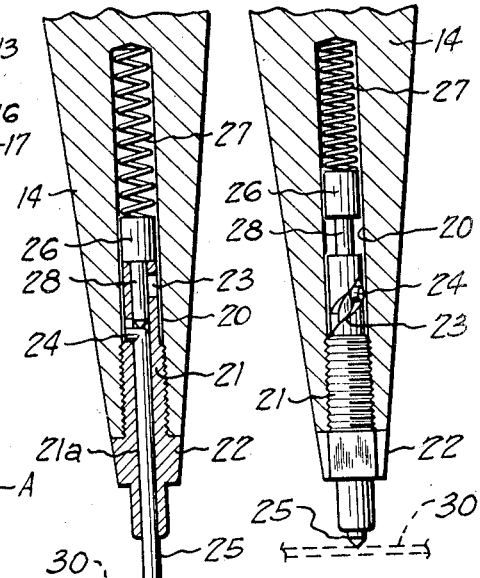
Figure 13:
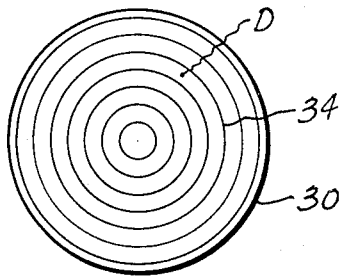

The invention will be more readily understood from a reading of the following specification and by reference to the accompanying drawings, in which an example of the invention is shown, and wherein:

Figure 1 is a view, partly in section and partly in elevation of an inclination indicator, constructed in accordance with the invention, Figure 2 is a transverse, vertical, sectional view, taken on the line 2—2 of Figure 1, Figure 3 is an enlarged, transverse, vertical, sectional view of the lower portion of the plumb bob, showing the marking element in a lowered position, prior to engagement with the index disk, the latter being shown in dotted lines, Figure 4 is a view, similar to Figure 3, with the marking element having been raised by engagement with the disk, Figure 5 is an enlarged, transverse, vertical, sectional view, taken on the line 5—5 of Figure 1, illustrating the timing and operating mechanism, Figure 6 is a transverse, vertical, sectional view, taken on the line 6—6 of Figure 5, Figures 7-8, 9-10 and 11-12 are schematic views of the operating mechanism for the index disks, said views illustrating the various positions of said mechanism during actuation thereof, and Figure 13 is a plan view of the record made by the device.

In the drawings, the numeral 10 designates an elongate, tubular casing which is preferably constructed of two main sections A and B which are connected to each other by means of a coupling collar or block 11. The upper section A is formed with an internal annular flange 12 which is located at its upper portion and the upper end of said section is closed by a suitable plug or cap 13. A plumb bob 14 is mounted within the upper section A and is arranged to undergo a universal movement therein. As is clearly shown in Figures 1 to 4, the plumb bob includes a main body portion which has a general conical shape and this body portion is provided with an upstanding stem 15. The plumb bob is suspended by means of a Cardan suspension which includes an inner ring 16 which is pivoted to the upper end of the stem 15 by a pivot pin 17. The inner ring 16 also has a pivotal connection with a supporting collar 18 through pivot pins 19, the latter pins being disposed at substantially a right angle to the axis of the pin 17. As is well known, a Cardan suspension permits a universal movement of the element supported thereby. It is manifest that this mounting of the upper end of the plumb bob 14 causes the plumb bob to retain a vertical position, regardless of the inclination of the tubular casing A.

The lower portion of the plumb bob 14 is formed with an axial bore 20 which extends upwardly from the lower end thereof (Figures 3 and 4). A guide sleeve 21 having a flange 22 at its lower end is threaded into the lower portion of the bore 20 and extends upwardly therein. When the sleeve 21 is in position within the bore of the plumb bob, the flange 22 thereof abuts the lower end of said plumb bob. The sleeve 20 is formed with a spiral or helical groove or slot 23 therein and this slot is for the purpose of guiding a radial pin 24 which is provided on the upper end of a marking element or pin 25. As is clearly shown in Figure 3, the marking element 25 is slidably mounted within the bore 21a of the guide sleeve 21 and the radial lug 24 at its upper end is located within the spiral slot 23. It will be obvious that when the element 25 is raised upwardly within the bore 21a, the coaction between the lug 24 and the slot 23 will result in a rotation of the element 25.

For constantly urging the marking element or pin 25 toward a lowered position with respect to the slot 23, a plunger 26 is mounted within the bore of the plumb bob above the guide sleeve 21. A coiled spring 27 is confined between the plunger and the upper end of the bore 20 and constantly exerts its pressure to push the plunger 26 downwardly, whereby a depending pin 28 on said plunger is held in engagement with the upper end of the marking element. Thus, it will be seen that when an upward force is exerted upon the marking element 25, said element is moved upwardly under pressure of the spring 27 and such upward movement causes a simultaneous rotation of the element through the coacting lug 24 and spiral groove 23. The plumb bob 14 overlies a record disk 30 which is constructed of a coated paper or other suitable material. The disk 30 is mounted within a recess 31 which is formed in the top of a circular supporting member 32. The supporting member 32 is provided with a depending tubular extension 33 which has a sliding fit within the bore of the coupling 11, whereby the supporting member 32 is capable of a vertical movement relative to the coupling. As is clearly shown, the coupling is provided with a bottom 11a which extends transversely across the interior of the casing and this bottom serves to limit the downward movement of the supporting member 32. Normally, the member 32 is in the position shown in Figure 1, whereby the record disk 30 is spaced from the lower pointed end of the marking element or stylus 25. When the member 32 is raised upwardly, it will be obvious that the disk 30 is moved into engagement with the stylus or marking element 25 and will serve to depress said stylus. Such depression of the stylus causes a rotation thereof, as has been explained, whereby the pointed end thereof forms a dot D on the disk 30. Such dot is representative of the inclination of the casing from the vertical for obviously, the marking element or stylus will form said dot in accordance with its position relative to the casing. If desired, the record disk 30 may be formed with a plurality of concentric lines 34 (Fig. 13), which lines may be representative of degrees so that the inclination of the casing in degrees may be readily ascertained by observing the disk.

For imparting an axial reciprocation to the supporting member 32 so as to move the disk 30 into engagement with the marking element or stylus 25, an operating mechanism is mounted within the lower section B of the casing 10. This section also houses a timing or clock mechanism C which is of the usual construction. The operating mechanism for imparting reciprocation to the member 32 includes an actuating rod 35 which has its upper end secured to the member 32, as is clearly shown in Figures 5 and 6. The rod 35 extends downwardly through an opening 36 provided in the bottom 11a of the coupling 11 and projects into the section B of the casing. The lower end of the rod 35 is connected by means of a pivot pin 37 with the upper end of a link 38 and the other end of this link has a pivotal connection 39 with an actuating disk 40. As is clearly shown in Figure 6, the pivotal connection 39 is located near the outer periphery of the actuating disk 40 and manifestly, when said disk is rotated, a reciprocation is imparted to the rod 35 through the link 38.

The actuating disk 40 is formed with a hub 41 which is fixed on a stub shaft 42. The ends of the stub shaft are journaled in suitable bearings which are mounted in vertical supporting plates or members 43 which are disposed within the section B of the casing. A flat spring 44 has one end secured to the hub 41 and is wound around said hub, having its opposite end suitably fastened to one of the supporting plates 43. The spring is so arranged as to constantly urge the disk toward a rotation in a counter-clockwise direction in Figure 6 and when the spring is wound, as will be hereinafter explained, a clockwise rotation is imparted to the actuating disk.

When the actuating disk 40 is in a set position prior to the reciprocation of the member 32 and in readiness for the marking operation, the link is in the position shown in full lines in Figure 10 and in dotted lines in Figure 6. At such time, as will be explained, the spring 44 has been wound and the actuating disk is held against rotation by a latching means which is controlled by the timing mechanism C. When the actuating disk is released, the spring 44 serves to impart a counter-clockwise rotation to the actuating disk 40, whereby the link 38 is moved from the position shown in dotted lines in Figure 6 to the position shown in full lines in this figure. Such movement of the link imparts an axial or vertical movement to the operating rod 35, whereby the record disk 30 carried by the member 32 is axially reciprocated within the casing 10 and is engaged with the marking element or stylus 25 to perform the marking operation.

As shown in Figure 6, the member 32 has just been reciprocated and is ready for the resetting operation and to accomplish such resetting, the actuating disk 40 is provided with a pinion 45 which is secured thereto and also to the stub stem 42 so as to be simultaneously rotatable with the disk 40. A gear rack 46 is in constant engagement with the pinion 45 and has its lower end enlarged as shown at 47, such enlarged lower end being slidable within a guide groove 48 which is formed between guide plates 43a which are secured between the supporting plates 43 on each side of the operating mechanism. The lower end of the gear rack is engaged by the upper end of an angular resetting element 49 which is capable of a vertical movement within the casing and which normally rests upon a plug 50 which closes the lower end of the section B of the casing.

The resetting member 49 has an inwardly directed lug 51 on its lower end and this lug extends substantially to the central portion of the casing and overlies a resetting stem 52 which is slidably mounted within, and which extends through an axial opening 50a provided in the plug 50. The upper end of the stem is formed with a resetting pinion 53 and below said pinion an enlarged nut 54 is secured to said stem to limit the downward movement of the stem. A depending collar 55 is formed integral with the plug 50 and surrounds the axial opening 50a. A hand knob 56 is threaded onto the lower end of the stem 52 and is provided with a recess 57, whereby an internal shoulder 58 is formed within the knob. A coiled spring 59 surrounds the stem 52 and is confined between the plug 50 and the shoulder 58 of the knob 56, said spring constantly exerting its pressure to urge the stem 52 downwardly relative to the plug. In its lowermost position, the pinion 53 at the upper end of the stem 52 is spaced immediately below the angular lug 51 of the angular resetting element 49.

In accomplishing a resetting of the actuating disk 40, the stem 52 is moved upwardly under tension of its spring so that the pinion 53 will strike the underside of the angular lug 51 and impart an upward movement to the angular setting element. Such upward movement of the element 49 will impart a similar movement to the gear rack 46, whereby a clockwise rotation is imparted to the pinion 45 and the actuating disk 40. Such clockwise movement continues until the link 38 is moved from the position shown in full lines in Figure 6 to the position shown in dotted lines in this figure and at this time, a notch 60 which is formed in the periphery of the actuating disk 40 is moved into alinement with an upper latching bar 61. When the latching bar engages the notch 60 (Fig. 10), further rotation of the disk 40 is prevented. As the disk is rotated to this position and into engagement with the latch bar 61, the flat spring 44 is wound, whereby when the latch bar 61 is disengaged from the notch 60, the spring will immediately impart a counter-clockwise rotation to the disk to reciprocate the member 32 and thereby perform the marking operation, as has been explained.

The upper latching bar 61 is confined between the guide plates 43a and has its lower end interconnected with a lower latching bar 62 by means of recesses 63 and lugs 64 (Fig. 5). When the lugs of the latching bars are engaging each other as shown in Figure 5, the ends of said bars are spaced from each other, being held apart by means of a coiled spring 65. The lowermost latching bar 62 is constantly urged downwardly relative to the upper latching bar by means of a wire spring 66, which engages within a recess 67 in the lower bar (Figures 5 and 6).

The lower end of the lowermost latch bar 62 is adapted to engage within a notch 68 which is formed in the periphery of a control disk 69. This control disk is mounted upon the drive shaft 70 of the clock mechanism C and is controlled in its rotation by said clock mechanism, as will be hereinafter explained. By observing Figure 5 it will be seen that the lower end of the latch bar 62 is reduced to provide a lateral shoulder 62a which is spaced from the lower end thereof. The angular resetting element 49 which engages the lower end of the gear rack 46 has a greater transverse width than said gear rack, whereby a portion of the upper end of the resetting element extends beyond the inner surface of said gear rack. With this arrangement, an upward movement of the setting element 49 will first result in an upward movement of the gear rack but upon initial movement, the latch bar 62 is not engaged by the element 49. However, after the element 49 has moved a predetermined distance upwardly, its upper end will engage the shoulder 62a on the lower latch bar 62 and will impart an upward movement to this latch bar.

In the operation of the upper and lower latch bars 61 and 62, said latch bars are in the position shown in Figure 5 immediately after the marking operation has been performed. At this time, the lower bar 62 is engaged within the notch 68 of the control disk 69, while the upper bar 61 has its upper end disengaged from the notch 60 of the actuating disk 40. In resetting the mechanism, the resetting element 49 is moved upwardly by means of the resetting stem 52, as has been explained. Upon initial upward movement of such element, the gear rack imparts a rotation to the actuating disk 40 so as to move the notch 60 toward the upper latching bar 61. During such initial movement, the lower latch bar remains in its same position engaging the notch. As soon as the resetting element 49 has moved upwardly a sufficient distance to engage the shoulder 62a of the lower latch bar 62, said lower latch bar is moved upwardly so as to disengage its lower end from the notch 68 in the control disk, such upward movement being against the pressure of the wire spring 66 and also against the pressure of the coil spring 65 between the latch bars. By the time that the upper end of the latch bar 62 engages the lower end of the latch bar 61, the notch 60 has been alined with the upper latch bar 61 and as soon as this alinement occurs, the spring 65 immediately moves the upper latch bar into the notch to lock the actuating disk. A continued operation of the resetting stem 52 will result in a resetting of the clock mechanism, as will now be explained, whereby the control disk 69 is rotated during such resetting of the clock mechanism. This rotation of the control disk 69 misalines the notch 68 therein with the lower latch bar 62, whereby said latch bar will engage the periphery of the disk. The parts remain in this position until such time as the clock mechanism C has rotated the control disk 69 back to a position where the notch 68 therein is again alined with the lower latch bar 62. As soon as this occurs, the wire spring 66 pushes the lower latch bar 62 downwardly into said notch and such downward movement imparts a downward movement to the upper latch bar 61 through the interconnection of the lugs 64 and recesses 63. It is manifest that a downward movement of the latch bar 61 will result in a disengagement of said bar from the notch 60 of the actuating disk 40, whereby the spring 44 may rotate the disk in a counter-clockwise direction to perform the marking operation.

The clock mechanism C is of the standard construction and includes a setting gear 71 which is fixed on the main shaft 70. This setting gear is located in a plane above the teeth of the resetting pinion 53, whereby when said pinion is moved upwardly, its teeth will engage the teeth of the gear 71. Thus, when the resetting stem 52 is moved upwardly it will first perform the resetting of the operating mechanism for the record disk 30 and will then engage with the resetting gear 71. Upon a rotation of the stem 52, a similar rotation will be imparted to the gear 71. As explained, the gear 71 is fixed on the shaft 70 which carries the control disk 69. Adjacent the resetting gear is a drive gear 72 which is loosely mounted on the shaft 70 and which is adapted to be connected with the resetting gear by means of a friction clutch 73. The main spring 74 of the clock mechanism has one end secured to the shaft 70 and its opposite end secured to a supporting plate 75 which is mounted within the casing. When the resetting gear 71 is actuated through the resetting stem 52, the spring 74 is wound. A dial 76 is secured to the setting gear 71 and has a portion thereof visible through a window 77 which is provided in the casing 10 and which is normally closed by a suitable lens 78. By observing the dial, the operator may rotate the gear 71 to set the clock mechanism for any predetermined time.

The remainder of the clock mechanism C is of standard construction and includes the usual gear train 79, escapement mechanism 80, hair spring 81 and balance wheel 82. The particular construction of this part of the mechanism is subject to variation as any suitable mechanism of this character may be employed.

In the operation of the device, assuming that the same is to be prepared to obtain a reading, the parts are in the position shown in Figures 5 and 6. The device is at the surface of the well where the setting of the same is performed. In accomplishing this setting, the resetting stem 52 is depressed under tension of the spring 59, whereby the pinion 53 is moved into engagement with the angular lug 51 of the setting element 49. Upon a continued depression of the stem 52, the element 49 serves to impart a movement to the gear rack 46 whereby the actuating disk 40 is rotated so as to move the link 38 from the position shown in full lines in Figure 6 to the position shown in dotted lines in this figure. During this rotation, the elements of the operating mechanism move to the position shown in Figures 7 and 8, the illustration in these figures showing the link 38 halfway through its movement.

As the element 49 continues its upward movement to complete the setting of the actuating disk 40, the upper end of said element strikes the overhanging shoulder 62a of the lower latch bar 62 and moves said latch bar upwardly so as to disengage its lower end from the notch 68 of the control disk 69. At this time, the upper latch bar 61 is riding on the periphery of the actuating disk 40. When sufficient movement has been imparted to the element 49 to cause the actuating disk to rotate sufficiently to aline its notch 60 with the upper latch bar 61, the coiled spring 65 between the upper and lower latch bars causes the upper latch bar to engage said notch and thereby lock the actuating disk 40 against movement. By the time that this is accomplished, the setting pinion 53 has moved upwardly so as to engage its teeth with the teeth of the resetting gear 71 of the clock mechanism. A rotation is then imparted to the stem 52 through the hand knob 56, whereby the gear 71 is rotated the desired number of degrees, as indicated by the dial 76 which is visible through the opening 77. The clock mechanism is thus set for the desired number of minutes.

As the gear 71 is rotated, a rotation is imparted to the main shaft 70 of the clock mechanism to wind the mainspring 74 and obviously, since the control disk 69 is secured to this shaft, the notch 68 therein is moved from beneath the lower latch bar 62 and is offset therefrom a number of degrees, such number being in accordance with the time for which the clock mechanism is set. As the setting of the clock mechanism and of the actuating mechanism is accomplished, the stem is returned to its lowermost position and at this time, the parts are in the position shown in Figures 9 and 10 of the drawings. The actuating disk 40 is locked against movement, being held so by the engagement of the latch bar 61 with the notch 60 and the notch 68 in the control disk 69 is misalined with the lower latch bar 62.

The record disk 30 is then inserted in position in its supporting member 32 below the plumb bob 14 and the device is ready to be lowered into the well bore. The timing or clock mechanism is properly set so as to provide sufficient time for the instrument to be lowered to its proper position in the well bore. Upon reaching this position, the instrument is permitted to remain at rest until the clock mechanism has operated a sufficient time to rotate the control disk 69 to a position with its notch 68 alined with the lower latch bar 62. Of course, the plumb bob 14 has remained in a vertical position due to its universal mounting and any inclination of the outer casing 10 due to an inclination of the well bore causes the marking element or stylus 25 to be off center of the record disk 30. The number of degrees which said stylus is off center of the disk is indicative of the number of degrees of inclination from the vertical of the well bore.

As soon as the control disk 69 has rotated to aline its notch 68 with the lower latch bar 62, said latch bar immediately drops into said notch, being moved downwardly by means of the wire spring 66. Such downward movement of the bar 62 imparts a similar downward movement to the upper bar 61, with the result that the upper bar is withdrawn from the notch 60 of the actuating disk. Withdrawal of the upper latch bar from its notch permits the flat spring 44 to immediately rotate the actuating disk 40 in a counter-clockwise direction (Figures 11 and 12) until the link 38 is again returned to the position shown in Figure 6. The rotation of the disk 40 in this manner imparts a reciprocation to the operating rod 35, whereby the supporting element 32, together with the record disk 30 is reciprocated axially of the casing.

The axial reciprocation of the disk 30 causes said disk to engage the point of the marking element or stylus and results in a depression of said stylus. As has been explained, depression of the stylus causes a rotation thereof through the co-acting lug 24 on said stylus and the spiral slot 23 in the guide sleeve 21. Thus, the stylus not only engages the disk 30 but also rotates during such engagement to assure that the mark D is clearly formed on the disk 30. Since the stylus is carried by the plumb bob and said plumb bob is off center relative to the casing in accordance with the number of degrees of inclination, it is evident that the mark D which is so formed indicates the degrees of inclination of the casing 10.

After the indication is made, the instrument is removed from the well bore and the record disk 30 removed therefrom. The device is then reset and another disk substituted for the one removed, after which the instrument is again ready to take another reading. It is pointed out that the operating mechanism which imparts the reciprocation to the record disk is relatively simple. It is so associated with the timing mechanism that when said timing mechanism is set for a predetermined time, the operating mechanism is automatically reset at the same time. This permits the use of a single resetting element or stem 52 for resetting the entire device, both the clock and the operating mechanism.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A device for determining the inclination of a well bore including, a casing adapted to be lowered into a well bore so as to assume the same inclination as said bore, a marking element within the casing suspended for universal movement therein, a record member below the marking element and normally spaced therefrom, means for imparting movement to the member to move the same into engagement with the marking element, whereby an indication which is representative of the angular relation of the marking element and casing is formed on said record member, a clock mechanism for controlling the actuation of the last-named means, whereby said means is operated at a predetermined time, movable means for resetting the operating means after the actuation thereof, rotatable resetting means for resetting the clock mechanism, and a single manually movable and a rotatable member normally free from connection with the operating parts of the device and movable in one direction only, such movement actuating the movable resetting means to reset the operating mechanism and also resulting in an engagement of said member with the rotatable resetting means, whereby subsequent rotation of the member effects a resetting of the timing mechanism.

2. A device for determining the inclination of a well bore including, a casing adapted to be lowered into a well bore so as to assume the same inclination as said bore, a marking element within the casing suspended for universal movement therein, a record member below the marking element and normally spaced therefrom, a spring-actuated operating mechanism within the casing and connected with the member for imparting an axial movement to the member to move the same into engagement with the marking element, whereby an indication representative of the angular relation of the element and casing is formed on said member, latching means for locking the operating mechanism against operation, a clock mechanism associated with the latching means for releasing said latch to permit actuation of the operating mechanism at a predetermined time, a movable resetting element associated with the operating mechanism and with the latching means and adapted to reset the mechanism and latch upon its movement in one direction, rotatable resetting means associated with the clock mechanism for resetting the same, and a single manually operable rotatable member movable in one direction only and arranged to engage the resetting element and the rotatable resetting means for effecting resetting of the operating mechanism, latching means and clock mechanism upon movement in one direction and subsequent rotation of the manually operable member.

3. An inclination indicating device including, a casing adapted to be lowered into a well bore so as to assume the same inclination as said bore, a plumb bob mounted within the casing and capable of universal movement therein, a depressible and positively rotatable marking stylus carried by the plumb bob, a record disk carrier below the stylus and normally spaced therefrom, and operating means within said casing connected with the carrier for imparting a reciprocation thereto, whereby said carrier is moved into engagement with the stylus to depress and rotate the same.

4. An inclination indicating device including, a casing adapted to be lowered into a well bore so as to assume the same inclination as said bore, a plumb bob mounted within the casing and capable of universal movement therein, a depressible and positively rotatable marking stylus carried by the plumb bob, a record carrier below the stylus and normally spaced therefrom, operating means within said casing connected with the carrier for imparting a reciprocation thereto, whereby said carrier is moved into engagement with the stylus to depress and rotate the same, and a clock mechanism for controlling the actuation of the operating means, whereby said means is actuated at a predetermined time.

5. An inclination indicating device including, a casing adapted to be lowered into a well bore so as to assume the same inclination as said bore, a plumb bob mounted within the casing and capable of universal movement therein, a depressible and positively rotatable marking stylus carried by the plumb bob, a record carrier below the stylus and normally spaced therefrom, operating means within said casing connected with the carrier for imparting a reciprocation thereto, whereby said carrier is moved into engagement with the stylus to depress and rotate the same, a clock mechanism for controlling the actuation of the operating means, whereby said means is actuated at a predetermined time, and a single resetting means associated with the operating means and the timing mechanism for simultaneously resetting both the means and mechanism after the same have been actuated.

6. A device for determining the inclination of a well bore including, a casing adapted to be lowered into a well bore so as to assume the same inclination as said bore, a marking element within the casing suspended for universal movement therein, a record holding member below the marking element and normally spaced therefrom, an operating rod connected to the member, a rotatable spring actuated disk connected to the rod for imparting reciprocation to the rod and member to move said member into engagement with the marking element, a latching means for locking the disk against rotation, a timing mechanism having connection with the latching means for releasing said means and permitting actuation of the disk to impart reciprocation to the member, a movable resetting element associated with the operating disk and with the latching means and adapted to reset the disk and latch upon its movement in one direction, rotatable resetting means associated with the timing mechanism for resetting the same, and a single manually operable rotatable member for actuating the resetting element and the resetting means to effect resetting of the operating disk, latching means and timing mechanism.

7. A device for determining the inclination of a well bore including, a casing adapted to be lowered into a well bore so as to assume the same inclination as said bore, a marking element within the casing suspended for universal movement therein, a record holding member below the marking element and normally spaced therefrom, an operating rod connected to the member, a rotatable spring actuated disk connected to the rod for imparting reciprocation to the rod and member to move said member into engagement with the marking element, a latching means for locking the disk against rotation, a timing mechanism having a drive shaft on which a resetting gear is mounted, a control disk secured to said shaft and associated with the latching means for releasing the same and permit operation of the disk, a resetting stem movable axially of the casing and being rotatable, said stem being adapted to engage the resetting gear of the timing mechanism to reset said mechanism and said control disk, and a resetting element associated with the disk and latch and arranged to be engaged and moved in one direction by the stem upon movement of the stem to simultaneously reset said disk and latch.

8. A device for determining the inclination of a well bore including, a casing adapted to be lowered into a well bore so as to assume the same inclination as said bore, a marking element within the casing suspended for universal movement therein, a record holding member below the marking element and normally spaced therefrom, rotatable spring-actuated means for imparting movement to the member to move the same into engagement with the marking element, a latching member normally engaging the spring-actuated means for preventing operation of said spring-actuated means, a rotatable clock-controlled element associated with the latching member for releasing said member from its engagement with the spring-actuated means to permit operation of the latter, a pinion secured to the spring-actuated means, a gear rack meshing with said pinion and arranged to be moved to rotate the pinion and reset the spring-actuated means, and a slidable bar for engaging the rack and operable from the exterior of the casing for actuating the gear rack and thereby accomplish the resetting of the spring-actuated means.

9. A device for determining the inclination of a well bore including, a casing adapted to be lowered into a well bore so as to assume the same inclination as said bore, a marking element within the casing suspended for universal movement therein, a record holding member below the marking element and normally spaced therefrom, rotatable, spring-actuated means for imparting movement to the member to move the same into engagement with the marking element, a latching member normally engaging the spring-actuated means for preventing operation of said spring-actuated means, a rotatable clock-controlled element associated with the latching member for releasing said member from its engagement with the spring-actuated means to permit operation of the latter, a pinion secured to the spring-actuated means, a gear rack meshing with said pinion and arranged to be moved to rotate the pinion and reset the spring-actuated means, and a slidable bar for engaging the rack and operable from the exterior of the casing for actuating the gear rack and thereby accomplish the resetting of the spring-actuated means, said slidable bar also having a connection with the latching member, whereby the latching member is re-engaged with the spring-actuated means to again lock the same against operation.

10. The combination with an inclination indicator having a plumb bob provided with a stylus and a support having a record member thereon below said stylus, of an operating means including, a spring-actuated rotatable disk, a connecting rod eccentrically connected to the disk and secured to the record member, whereby rotation of the disk imparts reciprocation to the support to move it into engagement with the stylus to mark said member, said disk having a notch in its periphery, a latching bar adapted to have one end engaged in said notch for locking the disk against rotation, a clock-controlled disk having a notch in its periphery adapted to receive the other end of the latch bar, said bar being of such length that when it engages the notch in the clock-controlled disk, it is released from the spring-actuated disk to permit rotation of the latter, and a single resetting means for simultaneously resetting the spring-actuated disk and clock-controlled disk, whereby the latching bar is re-engaged with the notch of the spring-actuated disk and is disengaged from the notch of the clock-controlled disk to return the parts to their original positions.

11. As a sub-combination in an inclination indicator, a plumb bob, having its upper end mounted to undergo universal movement, a depressible marking stylus mounted in the free end of said plumb bob, and coacting means on the stylus and plumb bob for imparting rotation to the stylus upon relative movement of the stylus and plumb bob whereby when said stylus is depressed it is also rotated.

12. As a sub-combination in an inclination indicator, a plumb bob mounted to undergo universal movement and having an axial bore in its free end, a non-rotatable sleeve disposed within the bore and having a helical guideway in its wall, a marking stylus within said sleeve having means co-acting with the guideway, whereby when the stylus is depressed said means and guideway impart a rotation thereto.

13. As a sub-combination in an inclination indicator, a plumb bob mounted to undergo universal movement and having an axial bore in its free end, a non-rotatable sleeve disposed within the bore and having a helical slot in its wall, a marking stylus within said sleeve having a radial pin engaging within said slot, whereby when the stylus is moved within the sleeve, a rotation is imparted thereto, and resilient means for normally urging the stylus outwardly of the sleeve.

ROSS E. WILEY.